Figure 1:
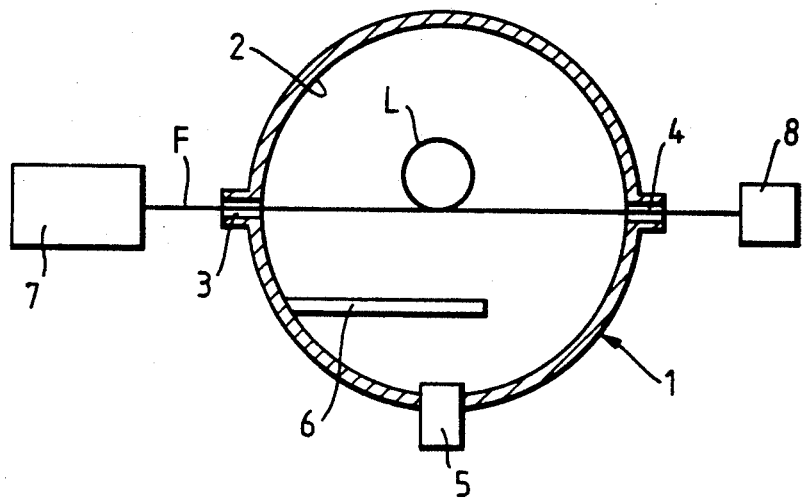

United States Patent [19]
Haigh

[11] Patent Number: 5,162,864
[45] Date of Patent: Nov. 10, 1992

[54] OPTICAL FIBRE MEASUREMENT

[75] Inventor: Neil R. Haigh, Eastham, England

[73] Assignee: BICC plc, London, England

[21] Appl. No.: 703,866

[22] Filed: May 21, 1991

[30] Foreign Application Priority Data

May 30, 1990 [GB] United Kingdom ................. 9012063

[51] Int. Cl.$^5$ ...................... G01N 21/84; G01N 21/59
[52] U.S. Cl. .................................... 356/73.1; 250/228
[58] Field of Search ............... 356/73.1, 236; 250/228, 250/227.16; 65/3.11

[56] References Cited

U.S. PATENT DOCUMENTS 4,360,268 11/1982 Zucker et al. ...................... 356/73.1
4,659,215 4/1987 Sumida et al. ..................... 356/73.1

Primary Examiner—Vincent P. McGraw
Attorney, Agent, or Firm—Oliff & Berridge

[57] ABSTRACT

Signal attenuation caused by a coating on an optical fibre is measured by feeding a length of the coated optical fibre into an integrating sphere assembly, forming within that part of the fibre within the sphere a loop of such a diameter that there is no risk of macrobending of the fibre and feeding the optical fibre out of the sphere to a detector. Light from a source is transmitted through the fibre and the power of the transmitted signal is continuously detected. The diameter of the loop is gradually decreased to cause macrobending of the fibre F and the strength of the light radiated through the coating by the macrobend in the fibre and collected and integrated by the sphere is monitored. The attenuation by the coating of the transmitted signal is determined from the discrepancy between the reduction of power of the transmitted signal and the increase in strength of the light radiated through the coating by the macrobend.

12 Claims, 2 Drawing Sheets

OPTICAL FIBRE MEASUREMENT

This invention relates to optical fibre measurement and is particularly concerned with the measurement of the absorption by a coating on an optical fibre of a signal transmitted along the fibre, such signal absorption generally and hereinafter being referred to as "attenuation".

It is desirable that optical fibres having coatings differing from one another in at least one respect, for example differences in at least one of material, colour and radial thickness, can be readily characterised to determine their suitability for particular applications and a simple and effective method for measuring the attenuation by a coating on an optical fibre of a signal transmitted along the fibre is required for this purpose. One standard technique currently employed is to measure the attenuation of a film of the coating material but this technique has the disadvantage that the properties of the film must be related to those of the fibre coating. Another technique that has been proposed requires a comparison between the attenuations of signals transmitted along coated and uncoated optical fibre samples. Measurement of attenuation of a signal transmitted along an uncoated optical fibre is fraught with difficulty because an uncoated optical fibre is very fragile and is liable to break during the measuring operation; moreover, there is no guarantee that the mode propagation will be identical in the coated and uncoated optical fibre samples.

With a view to providing for measurement of: 1) scattering loss (i.e., loss due to radiation through the side of the fiber an out through the coating) in a signal transmitted along an optical fibre; and 2) the output strength of the signal, a device has been proposed which comprises a sphere which has a diffuse reflectance coating on its internal surface, entry and exit ports at approximately diametrically opposed positions in the wall of the sphere for positioning of a length of optical fibre through the sphere, a detector in the wall of the sphere intermediate of the ports and, for blocking a direct view by the detector of an optical fibre extending through the sphere, a baffle which extends transversely across the sphere between a line extending between the ports and the detector. This device is known and hereinafter will be referred to as "an integrating sphere assembly". When using an integrating sphere assembly to measure scattering loss in a signal transmitted along an optical fibre and the output strength of the signal, light is launched into an optical fibre extending through the sphere of the integrating sphere assembly and the output strength of this signal is measured by a detector downstream of the outlet port. All radiation lost by scattering loss of the optical fibre is collected by the internally coated sphere and is integrated before it reaches the detector disposed in the wall of the sphere intermediate of the inlet and outlet ports.

It is an object of the present invention to provide an improved method of measuring the attenuation by a coating on an optical fibre of a signal transmitted along the fibre by means of an integrating sphere assembly as hereinbefore described, which method can be simply and readily effected and requires negligible preparation of an optical fibre sample.

According to the invention, the improved method comprises feeding a length of the coated optical fibre into the entry port of the sphere of an integrating sphere assembly, forming in that part of the fibre within the sphere a loop of such a diameter that there is no risk of macrobending of the fibre and feeding the optical fibre out of the exit port of the sphere to a detector for measuring the power of a signal transmitted along the fibre; transmitting light into one end of the fibre and detecting the power of the transmitted signal at the other end of the fibre; decreasing the diameter of said loop to cause macrobending of the fibre and detecting both the power of the transmitted signal and, by means of the detector of the integrating sphere assembly disposed intermediate of the inlet and outlet ports, the strength of light radiated through the coating by the macrobend in the fibre and collected and integrated by the sphere; and determining the attenuation by the coating on the optical fibre of the signal transmitted along the fibre from the discrepancy between the reduction of power of the transmitted signal and the increase in strength of the light radiated through the coating by the macrobend.

The loop in that part of the fibre within the sphere of the integrating sphere assembly may be exposed to air within the sphere and, in this case, preferably the loop is formed by wrapping the fibre around a substantially rigid mandrel of substantially circular cross-section which extends transversely of the fibre and which has an outer coating of reflective material and, in this case, the diameter of the rigid mandrel may decrease smoothly and gradually at a predetermined rate or in predetermined steps from one end of the mandrel to the other so that the diameter of the loop can be readily decreased by moving the mandrel in the appropriate sense in a direction transverse to the fibre and applying a tensile force to the fibre.

Preferably, with a view to reducing the effects of Fresnel reflections and losses which may occur at the interface between the coated fibre and air within the sphere of the integrating sphere assembly, the part of the fibre within the sphere and within which the loop is formed is immersed in a body of oil or other liquid having a refractive index approximating to that of the coating on the fibre. The body of oil or other liquid may be contained in a tank of a transparent or translucent material and, in this case, the loop of fibre may be suspended within the body of oil or other liquid or a mandrel around which the loop is formed may be immersed in the body of oil or other liquid. Alternatively, the body of oil or other liquid may be contained in a closed tray of a transparent or translucent material into and out of which the fibre is fed and within which a loop in the fibre is formed. For this purpose, the tray may include a smoothly curved upstanding wall within the body of oil or other liquid around and in contact with which the fibre is fed initially to form the loop. In all cases, the required decrease in diameter of the loop in the fibre is obtained by applying a tensile force to the fibre.

The invention also includes improved apparatus for use in the measurement of the attenuation by a coating on an optical fibre of a signal transmitted along the fibre, which improved apparatus comprises an integrated sphere assembly as hereinbefore described and, disposed within the sphere of the assembly, means for use in forming and decreasing the diameter of a loop in a part of a coated optical fibre extending between the entry and exit ports of the sphere.

The means for use in forming and decreasing the diameter of a loop in said part of a coated optical fibre may comprise any one of said means hereinbefore described.

Figure 2:
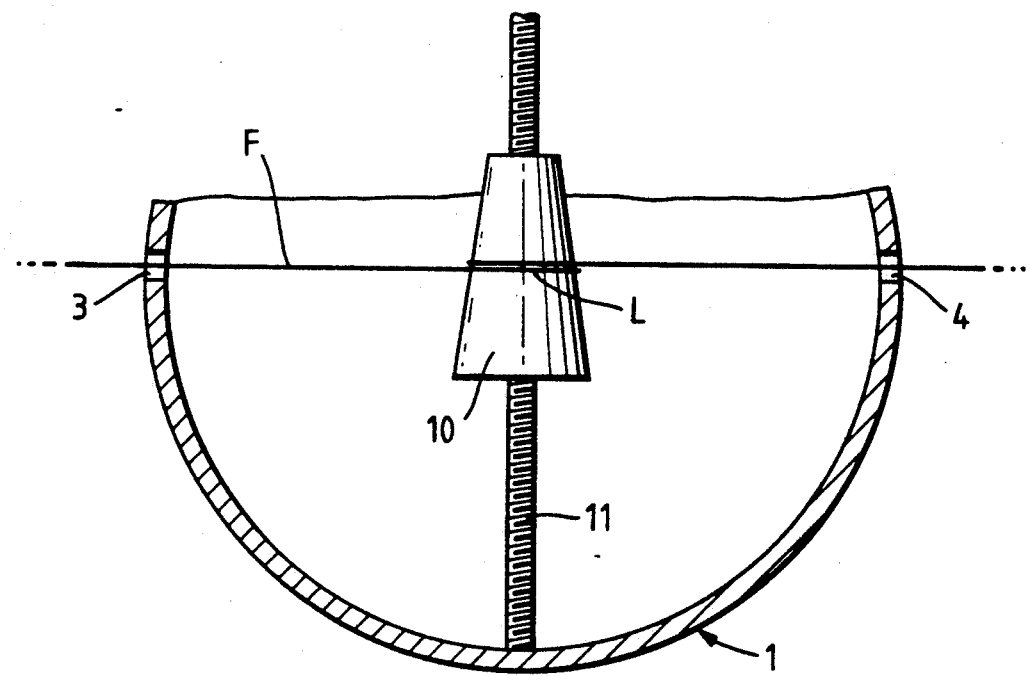
Figure 3:
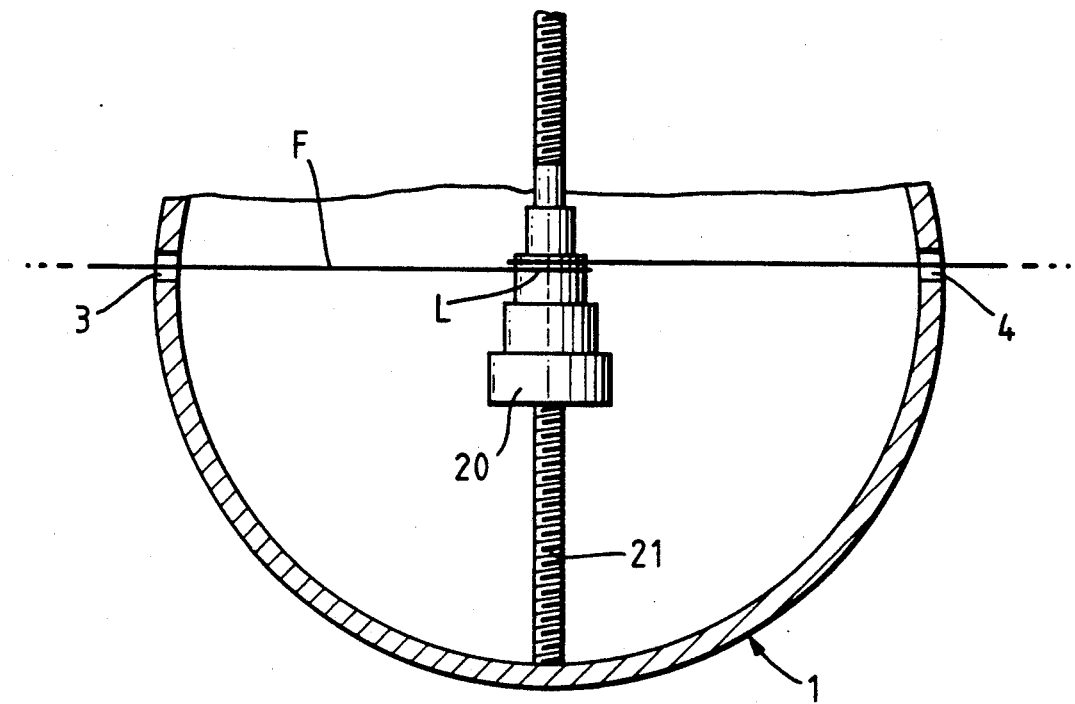
Figure 4:
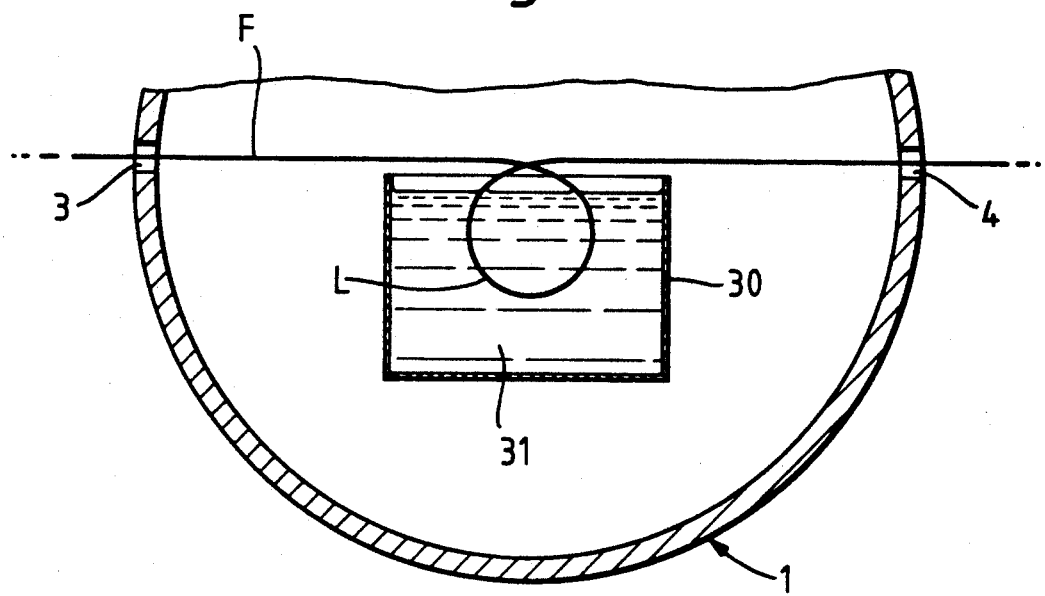

The invention is further illustrated by a description, by way of example, of preferred apparatus for and a preferred method of measuring the attenuation by a coating on an optical fibre of a signal transmitted along the fibre with reference to the accompanying drawings, in which:

FIG. 1 is a diagrammatic representation of an integrated sphere assembly as hereinbefore described having within the sphere a loop formed in a part of a coated optical fibre extending between the entry and exit ports of the sphere, and FIGS. 2 to 4, respectively, are fragmental diagrammatic representations of three preferred means for use in forming and decreasing the diameter of a loop in a part of a coated optical fibre extending between the entry and exit ports of the sphere of an integrated sphere assembly as hereinbefore described.

Referring to FIG. 1, the integrating sphere assembly comprises a sphere 1 which has a diffuse reflectance coating 2 on its internal surface, an entry port 3 and an exit port 4 at diametrically opposed positions in the wall of the sphere, a detector 5 in the wall of the sphere intermediate of the entry and exit ports and, for blocking a direct view by the detector, a baffle 6 which extends transversely across the sphere between a line extending between the entry and exit ports and the detector. Outside the sphere 1 and associated with the entry port 3 is a source 7 of light and outside the sphere and associated with the exit port 4 is a detector 8.

Disposed within the sphere 1 is any one of the means for use in forming and decreasing the diameter of a loop L in a part of a coated optical fibre F extending between the entry port 3 and exit port 4 of the sphere as illustrated in FIGS. 2 to 4.

Referring to FIG. 2, the first preferred means for use in forming and decreasing the diameter of a loop in a part of a coated optical fibre extending between the entry and exit ports of the sphere of an integrating sphere assembly comprises a rigid mandrel 10 of circular cross-section which is in screw threaded engagement on a screw-threaded shaft 11 which extends transversely with respect to a coated optical fibre F extending between the entry port 3 and the exit port 4 of the sphere 1. The rigid mandrel 10 has an outer coating of reflective material and the diameter of the rigid mandrel decreases smoothly and gradually at a predetermined rate from one end of the mandrel to the other. The rigid mandrel 10 is so mounted on the screw-threaded shaft 11 that, by appropriate rotation of the shaft, the mandrel can be caused to move along the shaft and transversely with respect to the coated optical fibre. As will be seen, the coated optical fibre F is wrapped once around the rigid mandrel 10 to form a loop L and by causing the mandrel to move in such a direction on the shaft 11 that the diameter of the mandrel around which the loop L is formed gradually decreases and by applying a tensile force to the fibre, the diameter of the loop in the fibre can be decreased to cause macrobending of the fibre.

In using the apparatus shown in FIGS. 1 and 2 to measure the attenuation by a coating on an optical fibre F of a signal transmitted along the fibre, a length of the coated optical fibre is fed into the entry port 3 of the sphere 1 of the integrating sphere assembly, is wrapped once around the rigid mandrel 10 to form a loop L of such a diameter that there is no risk of macrobending of the fibre and the length of fibre is fed out of the exit port 4 to the detector 8. Light from the source 7 is transmitted along the coated fibre F and the power of the transmitted signal is detected by the detector 8. The mandrel 10 is caused to move in such a direction on the shaft 11 that the diameter of the mandrel around which the loop L is formed gradually decreases and a tensile force is applied to the fibre so that the diameter of the loop gradually decreases to a diameter at which macrobending of the fibre occurs. The reduced power of the transmitted signal is detected by the detector 8 and the strength of light radiated through the coating by the macrobend in the fibre F and collected and integrated by the sphere 1 is detected by the detector 5 and the attenuation by the coating on the fibre by the signal transmitted along the fibre is determined from the discrepancy between the reduction of power of the transmitted signal and the increase in strength of the light radiated through the coating by the macrobend.

Referring to FIG. 3, the second preferred means for use in forming and decreasing the diameter of a loop in a part of a coated optical fibre extending between the entry and exit ports of the sphere of an integrating sphere assembly differs from the first preferred means shown in FIG. 2 only in that a rigid mandrel 20 having a diameter which decreases in predetermined steps from one end of the mandrel to the other is in screw-threaded engagement with a screw-threaded shaft 21. The second preferred means shown in FIG. 3 operates in the same manner as the first preferred means shown in FIG. 2.

In the third preferred means shown in FIG. 4 for use in forming and decreasing the diameter of a loop in a part of a coated optical fibre extending between the entry and exit ports of the sphere of an integrating sphere assembly, the loop L in the coated optical fibre F is immersed in a body 31 of oil which is contained in a tank of a transparent material and which has a refractive index approximating to that of the coating on the fibre. In this case, the diameter of the loop L is decreased smoothly and gradually by gradual increase of a tensile force applied to the fibre.

What I claim as my invention is:

1. A method of measuring the attenuation by a coating on an optical fibre of a signal transmitted along the fibre using an integrating sphere assembly comprising a sphere which has a diffuse reflectance coating on its internal surface, entry and exit ports at approximately diametrically opposed positions in the wall of the sphere for positioning a length of optical fibre through the sphere, a detector in the wall of the sphere intermediate of the ports and, for blocking a direct view by the detector of an optical fibre extending through the sphere, a baffle which extends transversely across the sphere between a line extending between the ports and the detector, which method comprises the steps of feeding a length of the coated optical fiber into the entry port of said sphere of said integrating sphere assembly; forming in that part of the fibre within the sphere a loop of such a diameter that there is no risk of macrobending of the fibre and feeding the optical fibre out of the exit port of the sphere to a detector for measuring the power of a signal transmitted along the fibre; transmitting light into one end of the fibre and detecting the power of the transmitted signal at the other end of the fibre; decreasing the diameter of said loop to cause macrobending of the fibre and detecting both the power of the transmitted signal and, by means of the detector of the integrated sphere assembly disposed intermediate of the inlet and outlet ports, the strength of light radiated through the coating at the macrobend in the fibre and collected and integrated by the sphere; and determining the attenuation by the coating on the optical fibre of the signal transmitted along the fibre from the discrepancy between the reduction of power of the transmitted signal and the increase in strength of the light radiated through the coating at the macrobend.

2. A method as claimed in claim 1, wherein the loop in the fibre is formed by wrapping the fibre around a substantially rigid mandrel of substantially circular cross-section which extends transversely of the fibre and which has an outer coating of reflective material.

3. A method as claimed in claim 2, wherein the diameter of the rigid mandrel decreases smoothly and gradually at a predetermined rate from one one end of the mandrel to the other and the diameter of the loop is decreased by moving the mandrel in the appropriate sense in a direction transverse to the fibre and applying a tensile force to the fibre.

4. A method as claimed in claim 2, wherein the diameter of the rigid mandrel decreases in predetermined steps from one end of the mandrel to the other and the diameter of the loop is decreased by moving the mandrel in the appropriate sense in a direction transverse to the fibre and applying a tensile force to the fibre.

5. A method as claimed in claim 1, wherein the part of the fibre within which the loop is formed is immersed in a body of liquid having a refractive index approximating to that of the coating on the fibre.

6. A method as claimed in claim 5, wherein the body of liquid is contained in a tank of a transparent or translucent material and the loop of fibre is suspended within the body of liquid.

7. A method as claimed in claim 5, wherein the body of liquid is contained in a tank of a transparent or translucent material in which is immersed a substantially rigid mandrel of substantially circular cross-section which extends transversely of the fibre and which has an outer coating of reflective material, the diameter of the mandrel decreasing from one end of the mandrel to the other, and the loop in the fibre is formed by wrapping the fibre around the immersed mandrel.

8. For use in the measurement of the attenuation by a coating on an optical fibre of a signal transmitted along the fibre, apparatus comprising an integrating sphere assembly comprising a sphere which has a diffuse reflectance coating on its internal surface, entry and exit ports at approximately diametrically opposed positions in the wall of the sphere for positioning a length of optical fibre through the sphere, a detector in the wall of the sphere intermediate of the ports and, for blocking a direct view by the detector of an optical fibre extending through the sphere, a baffle which extends transversely across the sphere between a line extending between the ports and the detector and, disposed within the sphere of the assembly, means for use in forming and decreasing the diameter of a loop in a part of a coated optical fibre extending between the entry and exit ports of the sphere.

9. Apparatus as claimed in claim 8, wherein said loop-forming means comprises a substantially rigid mandrel of substantially circular cross-section which extends transversely of a line extending between the entry and exit ports of the sphere and which has an outer coating of reflective material, the diameter of the mandrel decreasing from one end of the mandrel to the other.

10. Apparatus as claimed in claim 9, wherein the diameter of the rigid mandrel decreases smoothly and gradually at a predetermined rate from one end of the mandrel to the other.

11. Apparatus as claimed in claim 9, wherein the diameter of the rigid mandrel decreases in predetermined steps from one end of the mandrel to the other.

12. Apparatus as claimed in claim 8, wherein said loop-forming means includes a tank of transparent or translucent material containing a body of liquid having a predetermined refractive index.

* * * * *